United States Patent [19]

Breiter et al.

[11] 4,219,128
[45] Aug. 26, 1980

[54] SULFUR ELECTRODE CONTAINER CONSTRUCTION AND METHOD OF MANUFACTURE

[75] Inventors: Manfred W. Breiter, Schenectady; Debajyoti Chatterji, Latham; Randall N. King, Johnstown; Dong-Sil Park, Schenectady, all of N.Y.

[73] Assignee: Electric Power Research Institute, Inc., Palo Alto, Calif.

[21] Appl. No.: 950,138

[22] Filed: Oct. 10, 1978

Related U.S. Application Data

[62] Division of Ser. No. 837,381, Sep. 28, 1977, Pat. No. 4,131,226.

[51] Int. Cl.³ .................... B65D 25/14; B23K 31/00; H01M 2/00; H01M 2/08
[52] U.S. Cl. .................................. 220/453; 220/456; 429/104; 429/164; 429/174
[58] Field of Search .................. 220/450, 3, 67, 68, 220/454, 456, 457, 468, 66, 453; 229/5.9; 429/104, 164; 228/184

[56] References Cited

U.S. PATENT DOCUMENTS

| 682,648 | 9/1901 | Splitdorf | 429/164 |
|---|---|---|---|
| 2,127,269 | 8/1938 | Robinson | 220/453 |
| 2,288,182 | 6/1942 | Curtin | 220/453 |
| 2,853,222 | 9/1958 | Gallagher | 220/450 X |
| 3,072,517 | 1/1963 | Gaylord | 229/5.5 |
| 3,199,712 | 8/1965 | Nurkiewicz | 220/3 |
| 3,220,602 | 11/1965 | Ficker | 220/453 |
| 3,298,559 | 1/1967 | Lurie | 220/450 |
| 3,870,588 | 3/1975 | Yamamoto | 220/457 |
| 3,928,071 | 12/1975 | Thornton | 429/104 X |
| 3,959,013 | 5/1976 | Breiter | 429/104 X |
| 4,048,391 | 9/1977 | Tilley et al. | 429/104 |
| 4,084,040 | 4/1978 | King | 429/104 |

FOREIGN PATENT DOCUMENTS

| 47-25777 | 7/1972 | Japan | 429/104 |
|---|---|---|---|
| 50-22207 | 7/1975 | Japan | 429/104 |

*Primary Examiner*—Allan N. Shoap
*Attorney, Agent, or Firm*—Flehr, Hohbach, Test, Albritton & Herbert

[57] ABSTRACT

A plurality of sulfur electrode container constructions characterized by mild steel containers and discrete anticorrosive liners disposed within the containers and method of manufacturing each.

1 Claim, 13 Drawing Figures

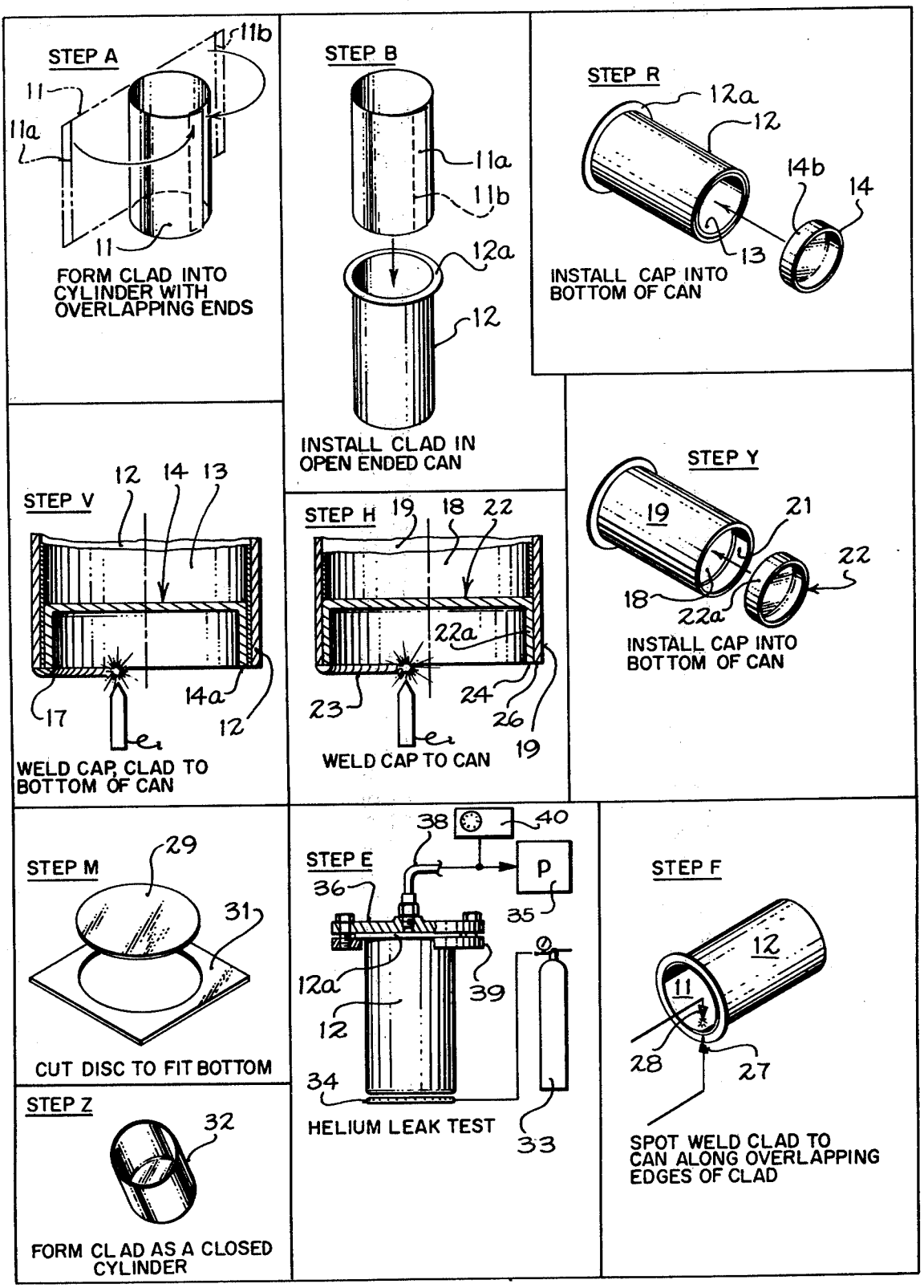
FIG_1A

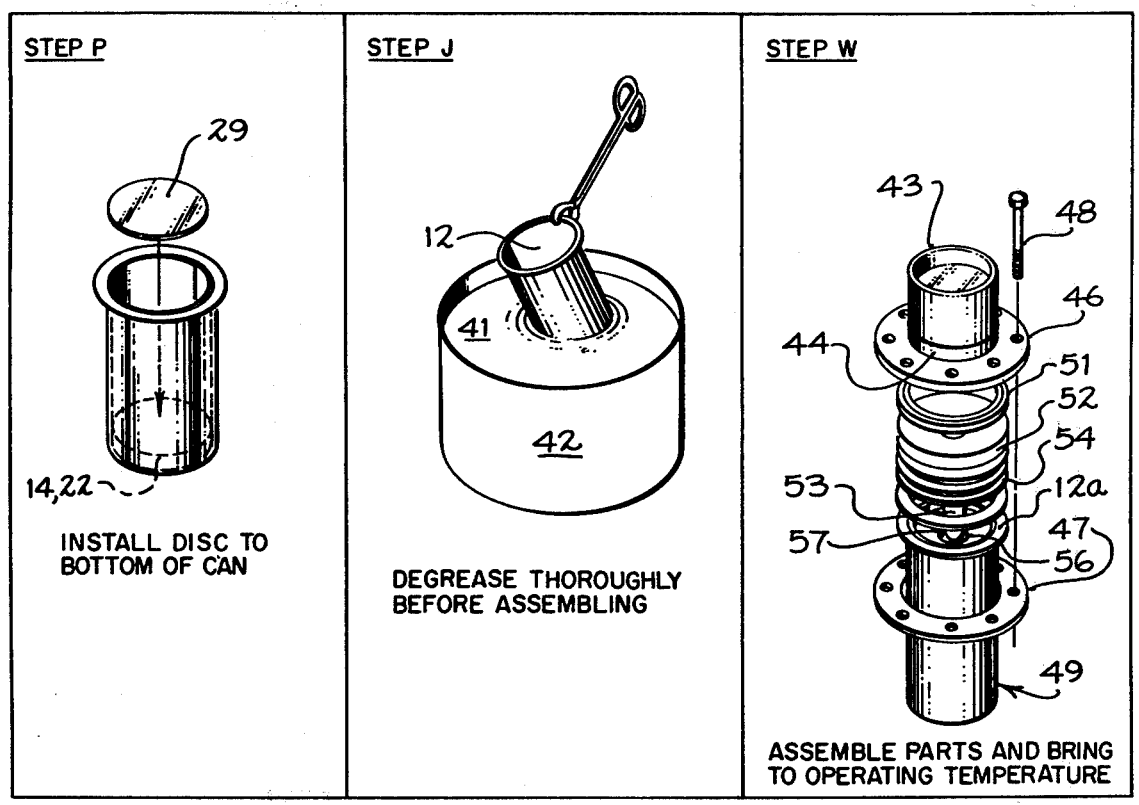
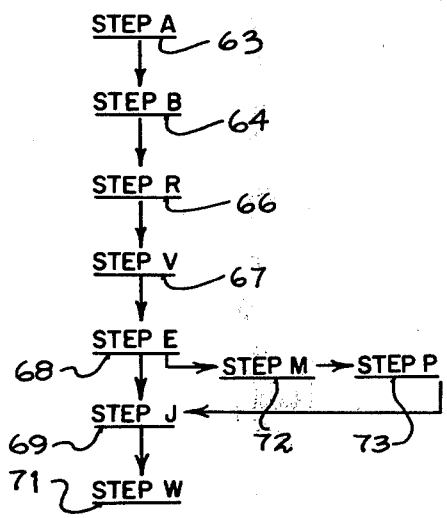
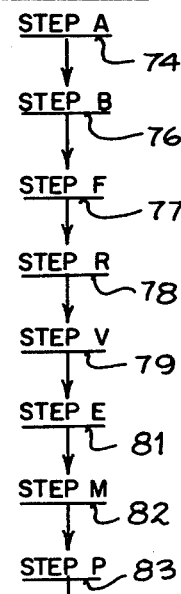
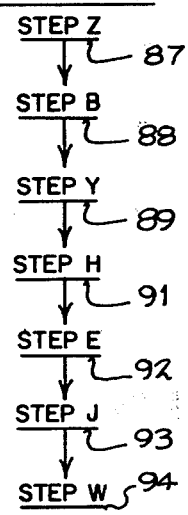
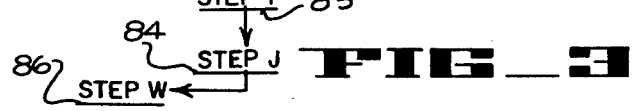

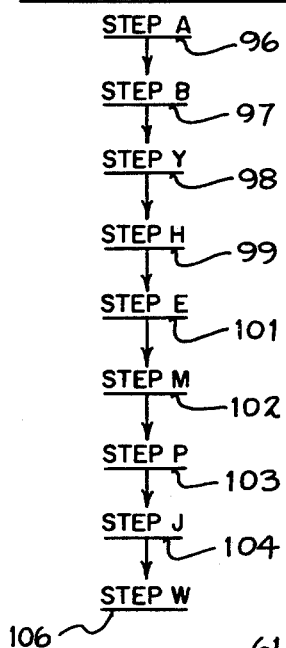
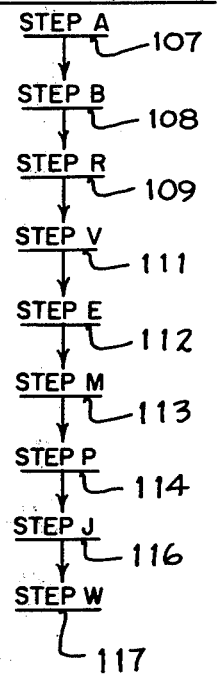
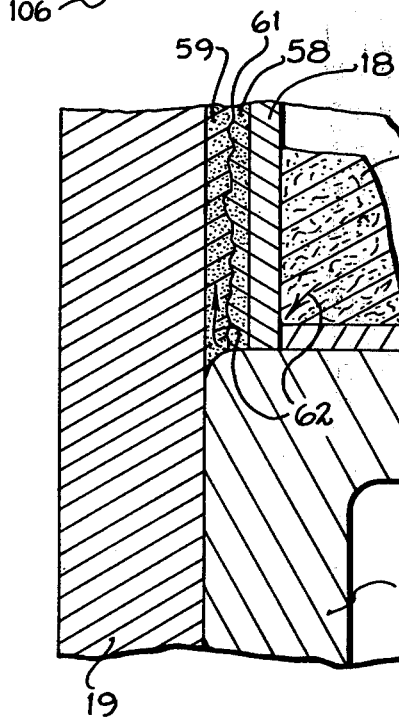

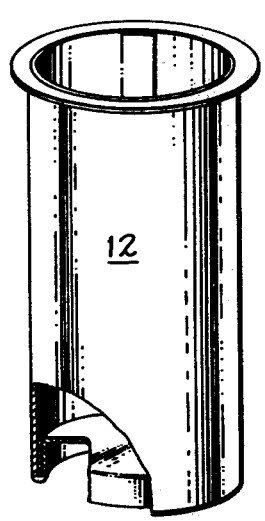
FIG_8
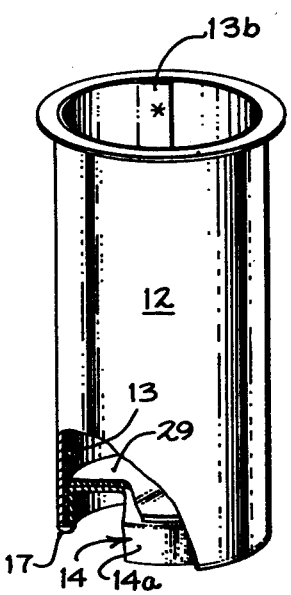
FIG_9
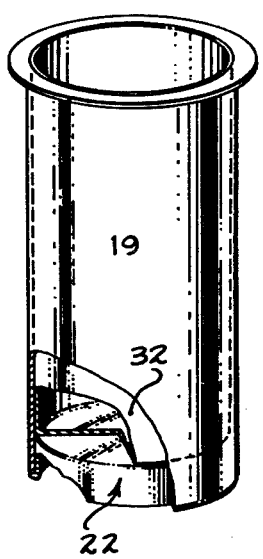
FIG_10
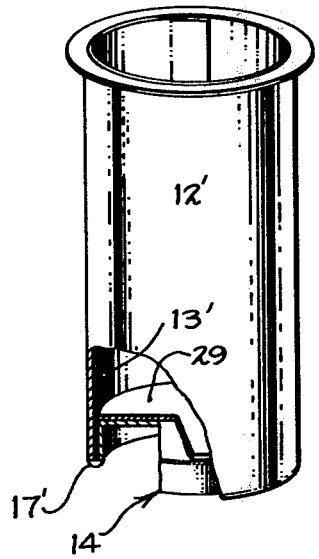
FIG_12
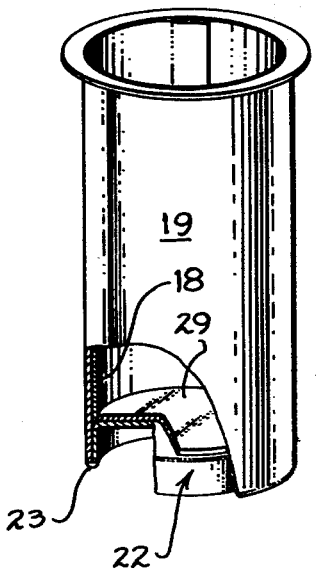
FIG_11

SULFUR ELECTRODE CONTAINER CONSTRUCTION AND METHOD OF MANUFACTURE

This is a division, of application Ser. No. 837,381 filed Sept. 28, 1977, now U.S. Pat. No. 4,131,226, issued Dec. 26, 1978.

BACKGROUND OF THE INVENTION

This invention pertains to a sulfur electrode container construction of a type for containing sulfur to be heated to liquid form for use as a portion of a sodium-sulfur cell, and more particularly to such a container construction characterized by a discrete liner of anti-corrosive material carried in protective relation with respect to the inner wall of the container in a manner sealing off the corrodible container wall from liquid sulfur.

This invention further pertains to a method of providing a sulfur electrode container construction of the kind described.

While sulfur electrode container constructions can be made of anti-corrosive material such as stainless steel, the use of these materials is expensive as compared to corrodible materials such as mild steel.

However, it has been observed that mild steel cans when used as sulfur compartments in sodium-sulfur cells are typically severely corroded by the sulfur/polysulfide melt during cycling. A considerable decrease in cell performance accompanies such corrosive attack so as to provide loss of capacity and increased cell resistance.

The present invention provides a composite sulfur electrode container construction characterized by an anti-corrosive discrete liner installed within a mild steel container in a manner substantially precluding corrosive contact therewith by sulfur in liquid form as well as a method of forming same.

SUMMARY OF THE INVENTION AND OBJECTS

In general there has been provided a sulfur electrode container construction for containing sulfur in liquid form for use as a sodium-sulfur cell. The container construction includes an outer rigid container of a material subject to corrosion by liquid sulfur. One end of the sulfur electrode container construction is open for receiving a plug of material containing sulfur to be melted therefrom while an end cap is disposed at the other end of the container construction. A discrete liner of a material substantially non-corrodible by liquid sulfur is disposed within the container in substantially contiguous relation with respect to the inner wall of the container for sealing same from the liquid sulfur therein. A gas tight seal is formed between the outer container and the end cap while the sulfur supporting surface of the end cap carries means forming an anti-corrosion barrier.

In general it is an object of the present invention to provide a composite sulfur electrode container construction in which the rigid outer container can constitutes a more inexpensive though corrodible material.

It is a further object of the present invention to provide an improved method of manufacturing a composite sulfur electrode container construction.

BRIEF DESCRIPTION OF THE DRAWINGS

FIG. 1A and 1B diagramatically illustrate a number of steps taken in the manufacture of a sulfur electrode container construction of the kind described. The steps, as shown, are not intended to be arranged in any given order as shown in FIGS. 1A-1B;

FIGS. 2 through 6 show associated flow charts employing various steps taken from FIGS. 1A-1B to provide composite container constructions as shown in FIGS. 8 through 12 according to the invention;

FIG. 7 shows an enlarged detail view in section of a corner portion of FIG. 11 according to the invention;

FIGS. 8 through 12 show sulfur electrode container constructions, according to the invention.

DETAILED DESCRIPTION OF PREFERRED EMBODIMENTS

In carrying out the methods disclosed in FIGS. 2 through 6 steps as illustrated in FIG. 1 are employed to ultimately provide sulfur electrode container constructions as shown in FIGS. 8 through 12, respectively, all of which are characterized by a discrete liner of non-corrosive material installed within a mild steel container in a manner substantially precluding corrosive contact between liquid sulfur in the construction and the mild steel walls of the container.

As noted above, the designations of the various steps illustrated in FIG. 1 are arbitrary to the extent that they are not shown in any particular order in FIG. 1, but are used in the methods of FIGS. 8 through 12.

With reference to Step A, a flexible anti-corrosive foil 11 such as 347 stainless steel is rolled as a cladding into the shape of a cylindrical liner so that it fits snugly into the open ended rigid can or container 12 shown in Step B. The edge margins 11a, 11b are disposed in slightly overlapping relation as shown in both steps A and B to form an open-ended cylinder to be installed into container 12.

In order to seal off the bottom end of container 12 in a manner providing a gas tight seal, one or the other of the two pairs of steps R and V or Y and H is employed, or, as will be seen further below, according to one embodiment the step shown as step Z can be employed in conjunction with a slight modification of step H.

With respect to step R, cylindrical liner 13 extends as least coextensive with the end edge of container 12 and preferably slightly beyond so that when an end cap 14, formed with a flanged axially outwardly directed outer periphery 14b, is inserted into container 12, the bottom edge 14a of flange 14b, bottom edge of container 12 and bottom edge of liner 13 can all be welded simultaneously by a seam 17 of welding material as shown in step V. As thus arranged a gas tight seal is formed in the bottom of container 12 with no path within the container for liquid sulfur to attack the sidewall of container 12.

As shown in steps Y and H a liner 18 is disposed short of the end edge 26 of container 19 so that the length of the liner serves to leave an inner end edge margin 21 of container 19 exposed. An end cap 22 comparable to end cap 14 includes a cylindrical flange portion 22a engaging margin 21 of container 19. A welding seam 23 serves to seal the adjacent end edges 24, 26 of cap 22 and container 19, respectively, so as to provide a gas tight seal therebetween.

One means for supporting the liner to be carried in substantially contiguous relation with respect to the inner wall of the container for sealing the liner thereto to protect the wall from liquid sulfur is illustrated in step F wherein the clad or liner is spot welded to the container along its overlapping edge margins. Thus a pair of opposed welding probes 27, 28 are arranged to pass lengthwise along the interior of container 12 so as to attach liner 11 to the interior of the container.

Means for protecting the interior surface of end cap 14 or 22 is diagrammatically shown in steps M and P wherein a disc of clad material is cut to fit the bottom closure surface thereby providing a disc 29 cut from the foil material 31. In step P disc 29 is shown being installed upon the top surface of end cap 14, 22 inasmuch as disc 29 can be useful in either one of the two situations shown in steps V or H.

According to one construction the clad is formed as a closed cylinder 32 which can then be directly inserted into a container, such as 19.

Step E diagrammatically shows the application of a helium leak test to the sulfur electrode container construction. A container 33 of helium under pressure is coupled to a perforated rubber tubing 34 disposed adjacent the area to be tested. At the same time a vacuum pump 35 draws a vacuum on the interior of container 12 via line 38 coupled to a fitting mounted in the top of a test closure 36. A sulfur electrode container construction of the kind described is supported by means of the flange 12a clamped between closure 36 and an annular clamping ring 39. Any leakage of helium into container 12 becomes readily detected by a mass spectrometer 40 coupled to the vacuum line 38.

Step J diagrammatically illustrates the procedure of degreasing components before assembling same as by means of dipping a container 12 into a body of degreasing solution 41 disposed in a container 42.

Finally, as shown in step W the parts are assembled together with the other parts to form a sodium-sulfur cell assembly. Then the entire construction is brought to operating temperature whereupon the sulfur contained within the plug or body of carbon mat and sulfur disposed within the sulfur electrode container assembly is heated to a point whereby the sulfur is melted out of the plug.

As is known, a sulfur "plug" comprises a precast cylindrical body of sulfur and carbon mat, usually with a central opening 57 (step W). The carbon mat is impregnated with sulfur. In operation the carbon does not melt but the sulfur does, leaving a carbon structure within the container.

The parts shown in step W when assembled form a sodium-sulfur cell assembly along the lines of the assembly shown in U.S. Pat. No. 3,959,015 wherein an anode casing 43 is arranged to contain sodium. A band of electric insulation 44 encircles casing 43. Casing 43 is formed at its lower end edge with a radially outwardly extending flange (not shown) which serves to support a clamping ring 46. A corresponding clamping ring 47 engages flange 12a from beneath whereby fastening means, such as bolts 48, can serve to draw the two component sections together.

A mechanical seal is formed between anode casing 43 and the sulfur electrode container 49 by means of the annular sealing ring 51, the ceramic annular disc 52 which serves to carry centrally thereof the downwardly depending beta alumina tube 53. Beneath disc 52 an additional sealing ring 54 is provided. Plug 56 of sulfur, graphite and the like is disposed centrally within container construction 49 and is formed with a central opening 57 therein.

Using the foregoing steps there is provided methods as now to be described with respect to FIG. 2 through 6 for forming sulfur electrode container constructions shown in FIG. 8 through 12.

As shown in FIG. 2 a flow chart is provided outlining the steps associated with the manufacture of a sulfur electrode container construction in which a mild steel container is protected by a liner of a flexible stainless steel foil rolled as a cladding in the shape of a cylinder.

The methods represented by the flow sheets of FIGS. 2 through 6, noted above, relate to the method of constructing each of the embodiments of FIGS. 8 through 12, respectively. Further as noted, each of these embodiments provides a composite sulfur electrode container characterized by a liner of non-corrosive material installed within a mild steel container in a manner substantially precluding corrosive contact between the liquid sulfur and the mild steel container.

It will be noted that the embodiments of FIGS. 8, 9 and 12 are constructed in a manner so as to capture the lower end edge margin of liner 13 between the cylindrical side 14a of end cap 14 and the sidewall of container 12.

The embodiment shown in FIG. 10 discloses a unitary closed cylinder 32 formed as an integral liner structure from a single piece of material from which there obviously can be no leakage at the bottom end due to the absence of any joint or seam.

Finally, the construction shown in FIG. 11 is protected from the corrosive action of liquid sulfur by means as now to be described with respect to FIGS. 5 and 7 as well as FIG. 11.

Pursuing the method shown in FIG. 5, step 96 entails the step of initially forming a flexible molybdenum foil (e.g. having a thickness of the order of 2 mils) cut and rolled as a cylinder as shown in step A and sized to snugly fit into mild steel can 19. The length of the foil liner 18 when fully installed serves to leave an exposed margin 21 of the interior wall surface of container 19. Accordingly steps 98, 99 correspond to the steps Y and H earlier described. Step 101 corresponds to the helium leak test shown in step E. Step 102 is directed to the provision of a disc 29 while step 103 pertains to the installation of disc 29 onto the sulfur supporting surface of end cap 22. At this point the sulfur electrode container is degreased at step 104 before it is assembled at step 106 into the sodium-sulfur cell assembly.

After the sodium-sulfur cell assembly has been assembled and the unit heated to its operating temperature with plug 56 of the sulfur and carbon mat material heated to a point whereby some sulfur liquifies and some sulfur converts to a vapor phase.

In view of the fact that (FIG. 7) there is no sealing of the interface between the edge of disc 29 and the lower edge margin of liner 18, the sulfur vapors will pass as indicated by arrows 62 between the junction formed between disc 29 and liner 18 so as to pass into the space defined between liner 18 and the inner sidewall of container 19. This sulfur gas tends to form an iron sufide coating 59 on the inner wall of container 19 while at the same time forming a coating 59 of a sulfide of the material used for liner 18, such as molybdenum sulfide. The interface 61 between coatings 58, 59 is believed to constitute a mechanically interlocked supporting relationship between the two coatings while the entire space between liner 18 and container 19 is filled with substantially impervious material so as to prevent liquid sulfur from entering that particular space. Thus, the liner is held firmly in place without welding.

According to another embodiment, the method shown in FIG. 4 provides a protective liner in the form of the one piece closed cylinder 32, as shown in step Z. Accordingly, the method in FIG. 4 starts with step 87 corresponding to step Z, followed at step 88 by installation of cylinder 32 into a cylinder 19, as at step B. Steps 89, 91 respectively correspond to the procedure shown at steps Y and H of FIG. 1 with the exception that liner 32 which has been inserted covers the top of cap 22. Subsequently a helium leak test is accomplished at step 92 followed by degreasing at step 93 and subsequent assembly of the sulfur electrode container construction into a sodium-sulfur cell assembly at step 94.

Accordingly, following the steps of the method of FIG. 4 provides the embodiment shown in FIG. 10.

The embodiment shown in FIG. 8 is constructed following the steps of the method noted in FIG. 2 in which a flexible foil of stainless steel (347) is rolled as a cladding in the shape of a cylinder so that it fits snugly into the open end of the can as accomplished by steps 63, 64. The bottom end of a container 12 is sealed off by the steps 66, 67 wherein an end cap 14 is inserted into the end of container 12 in a manner sandwiching the lower end edge margin of liner 13 between the inner sidewall of container 12 and the flange portion of cap 14. The further aspect of step 67 shown in FIG. 1A at step V is the provision of the welding seam 17 which serves to merge the bottom end edges of flange portion 14a, liner 13, and container 12. In this way a helium leak tight seal is formed at the bottom of the container construction of FIG. 8. After applying a helium leak test at step 68 the container construction is thoroughly degreased at step 69 and then is assembled at step 71 as part of the sodium-sulfur cell assembly as shown at step W.

The foregoing method contemplates that end cap 14 will be constructed from a stainless steel material capable of withstanding attack from liquid sulfur so that the end disc 29 will not necessarily be required. However, to further economize on the construction shown in FIG. 8 a disc 29 of stainless steel foil can be installed on the sulfur supporting surface of cap 14 as shown in FIG. 9 in which disc 29 comprises a stainless steel foil material. These steps are represented in FIG. 2 by the inclusion of the steps 72, 73.

FIG. 3 discloses a method of construction of an embodiment as shown in FIG. 9 in which the foil liner 13 comprises a nickel-chromium material having substantially 50% nickel and 50% chromium. Thus, as shown in FIG. 3 steps 74, 76 correspond to Steps A and B of FIG. 1A in which a nickel-chromium foil is wrapped to form a cylindrical liner installed into container 12. Step 77 represents spot welding of the clad along the overlapping edges thereof to container 12 while steps 78, 79 correspond to the previously described technique shown in steps R and V of FIG. 1A.

Step 81 pertains to the provision of a helium, leak test to the construction while thereafter disc 29 is cut and installed at steps 82, 83, respectively. Finally, after degreasing at step 84 the sulfur electrode container construction of FIG. 9 is assembled with the remaining components of a sodium-sulfur cell assembly as shown in step 86, corresponding to step W of FIG. 1B.

With regard to the embodiment shown in FIG. 9, liner 13 is shown with overlapping edge margins in which one of the edge margins 13b is welded in overlapped relation to the other edge margin.

The method of FIG. 6 provides the container construction of FIG. 12 and commences with steps 107, 108 whereby molybdenum foil is formed and installed into an open ended cylindrical mild steel container 12'. In order to form a closure to container 12' step 109, 111 corresponding to steps R and V in FIG. 1A are employed in order to sandwich the lower end edge margin of liner 13' between the flange portion 14a of closure 14 and the inner sidewall of container 12'. As noted above, one aspect of step 111 is the provision of a welded seam 17 identified as 17' in FIG. 12 along the bottom edge of the flanged portion of cap 14, liner 13' and container 12'. Further, after a helium leak test at step 112 a disc 29 is cut from a piece of molybdenum foil material at step 113 and installed at step 114 onto the top surface of end cap 14.

The sulfur electrode container construction is degreased thoroughly and then assembled as a part of a sodium-sulfur cell assembly at steps 116, 117, respectively.

From the foregoing is should be readily evident that there has been provided a means for employing the more inexpensive mild steel containers as sulfur compartments in sodium-sulfur cells in a way whereby they will be protected from corrosion by liquid sulfur as occurring in operation. Accordingly, means have been provided for effectively sealing the corrodible can surface from liquid sulfur contained therein by interposing a discrete liner of a clad material such as stainless steel, molybdenum, and nickel-chromium as disclosed herein. The end of the container must also be protected and, accordingly, discs of protective foil material are disposed upon the end cap surface to protect the end cap from attack.

In the embodiment shown in FIG. 8 the end cap is formed of stainless steel or other substantially non-corrodible material so as to require no overlying protective disc where the expense of manufacturing merely the end cap alone from stainless steel can be justified.

Thus, mild steel and other relatively low cost materials which are significantly subject to corrosion by liquid sulfur are able to be employed.

We claim:

1. A sulfur electrode container construction for containing sulfur to be heated in liquid form for use as a portion of a sodium-sulfur cell, said sulfur electrode container construction comprising an outer rigid container of a material readily corroded by liquid sulfur, one end of said container construction being open for receiving a plug of material therethrough of a type containing sulfur to be melted therefrom, an end cap at the other end of said container construction said end cap having a sulfur supporting portion, a discrete liner nesting within said outer container and of a material substantially non-corrodible by liquid sulfur, intermediate wall means for supporting said liner in substantially contiguous relation with respect to the inner wall of said outer container and serving to seal said inner wall from said liquid sulfur, a gas tight seal defined between said end cap and said outer container, and an anti-corrosion barrier carried at the sulfur supporting surface of said end cap, said intermediate wall means for supporting said liner comprising iron sulfides carried on said inner wall and sulfides of the liner material carried on the radially outer wall surface of said liner, said sulfides being mutually engaged to close the space between said inner and said radially outer wall surfaces and to hold said liner to said inner wall surface.

* * * * *